Aug. 29, 1967         F. D. SMITH         3,339,134
GATE CONTROL FOR SILICON CONTROLLED RECTIFIERS
Filed March 22, 1965         2 Sheets-Sheet 1

INVENTOR.
FOREST D. SMITH
BY
Akel C. Benson
ATTORNEY

Aug. 29, 1967   F. D. SMITH   3,339,134
GATE CONTROL FOR SILICON CONTROLLED RECTIFIERS
Filed March 22, 1965
2 Sheets-Sheet 2

INVENTOR.
FOREST D. SMITH
BY
Akel C. Benson
ATTORNEY

United States Patent Office 3,339,134
Patented Aug. 29, 1967

3,339,134
GATE CONTROL FOR SILICON CONTROLLED RECTIFIERS
Forest D. Smith, St. Louis Park, Minn., assignor to Electric Machinery Mfg., Company, Minneapolis, Minn., a corporation of Minnesota
Filed Mar. 22, 1965, Ser. No. 441,797
5 Claims. (Cl. 321—43)

The herein disclosed invention relates to firing devices for firing an electronic trigger valve and has for an object to provide a device by means of which the same may be operated by several controls functioning independently.

Another object of the invention resides in providing a device capable of firing a silicon controlled rectifier.

A still further object of the invention resides in providing a device capable of operating at low voltages.

An object of the invention resides in providing a single device capable of use with different output circuits and for different purposes.

Other objects of the invention reside in the novel combination and arrangement of parts and in the details of construction hereinafter illustrated and/or described.

Figure 1:
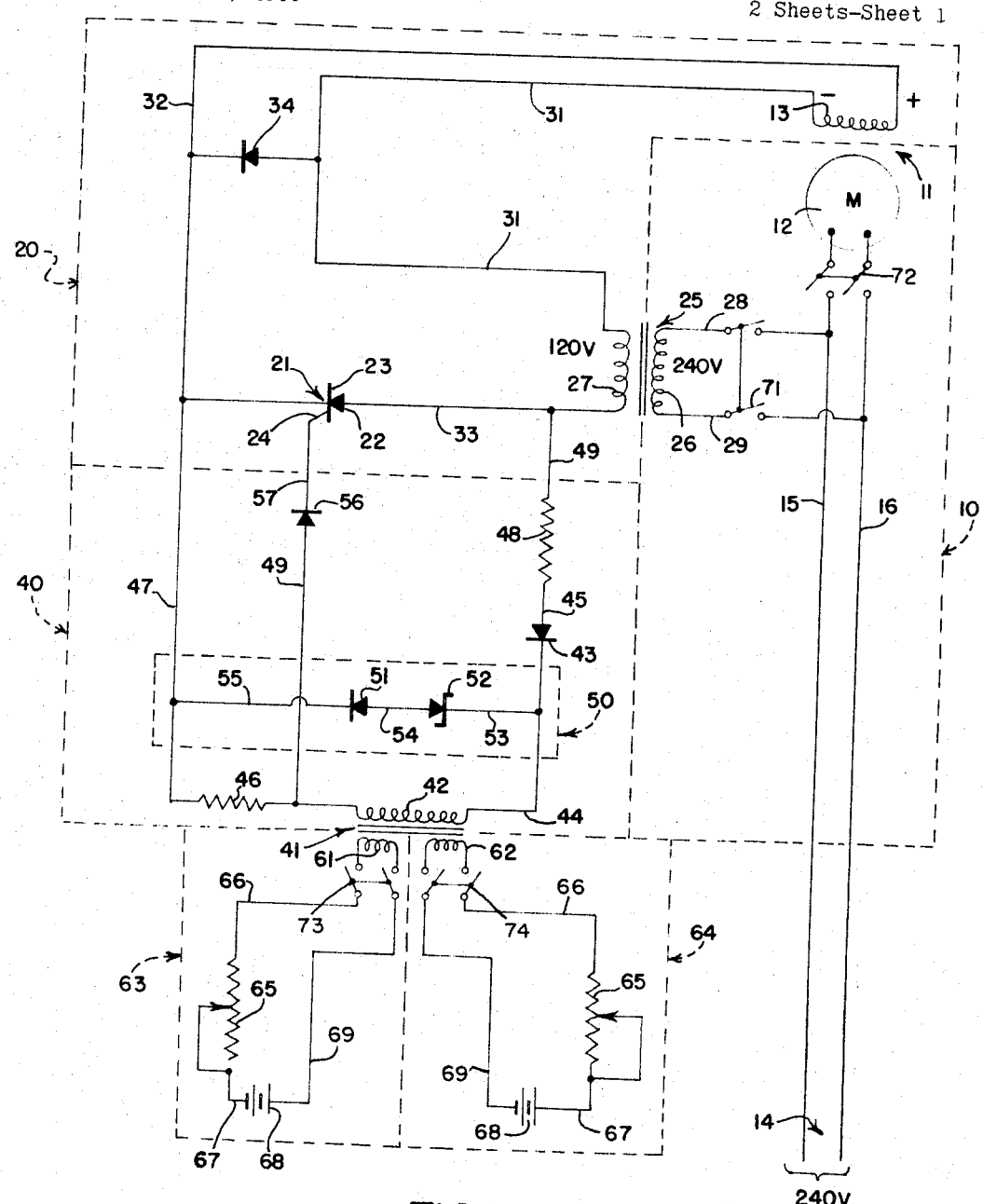
FIG. 1 is a wiring diagram of a power factor control utilizing a firing device for an electronic trigger valve forming a part thereof and illustrating an embodiment of the invention.

For the purpose of explaining the invention, a conventional synchronous motor 11 is shown which has an armature 12 and a field winding 13. The armature 12 is connected by means of two conductors 15 and 16 to a source 14 of alternating current having a voltage of 240 volts. The circuit including the armature 11 has been referred to as the armature circuit 10.

The field winding 13 is connected in a field winding circuit 20 which includes the field winding 13 and a silicon controlled rectifier 21 having an anode 22, a cathode 23 and a gate 24. Circuit 20 is energized from the source of alternating current supply 14 by means of a transformer 25 having a primary 26 and a secondary 27. Primary 26 is connected by conductors 28 and 29 to the conductors 15 and 16. One side of the field winding 13 is connected by means of a conductor 31 to one end of the secondary 27 of transformer 25. The other end of the field winding 13 is connected by means of a conductor 32 to the cathode 23 of silicon controlled rectifier 21. A conductor 33 connects the other end of secondary 27 to the anode 22 of rectifier 21. A diode rectifier 34 is connected across the conductors 31 and 32.

For controlling the operation of the silicon controlled rectifier 21 a firing circuit 40 is employed which includes a magnetic amplifier 41. This amplifier has a firing winding 42 which is connected at one end to a diode rectifier 43 by means of a conductor 44 and which in turn is connected by means of a conductor 45 to a resistor 48. Resistor 48 is connected by means of a conuctor 49 to conductor 33. The other end of said firing winding is connected by means of a conductor 49 to a diode rectifier 56 which in turn is connected by means of a conductor 57 to the gate 24 of silicon controlled rectifier 21. The firing circuit 40 further includes a limiting resistor 46 which is connected at one terminal to conductor 49 and at its other terminal through a conductor 47 to the conductor 32 and thus to the cathode 23 of the silicon controlled rectifier 21.

A voltage clamping circuit 50 is also employed which includes a diode rectifier 51 and a voltage regulator 52 such as a Zener diode. The voltage regulator 52 is connected by means of a conductor 53 to conductor 44 and by means of a conductor 54 to diode rectifier 51. This rectifier is in turn connected by means of a conductor 55 to conductor 47.

The magnetic amplifier 41 is also provided with one or more control windings 61 and 62 having control circuits 63 and 64 associated therewith. These circuits being similar, only circuit 63 will be described. This circuit includes a manually operated rheostat 65 which is connected at one end to one end of winding 61 by means of a conductor 66 and to one side of a source of direct current 68 by means of a conductor 67. The other side of this source of direct current is connected by means of a conductor 69 to the other end of winding 61.

While two control windings have been shown, one or a greater number can be used to meet the requirements.

Figure 2:
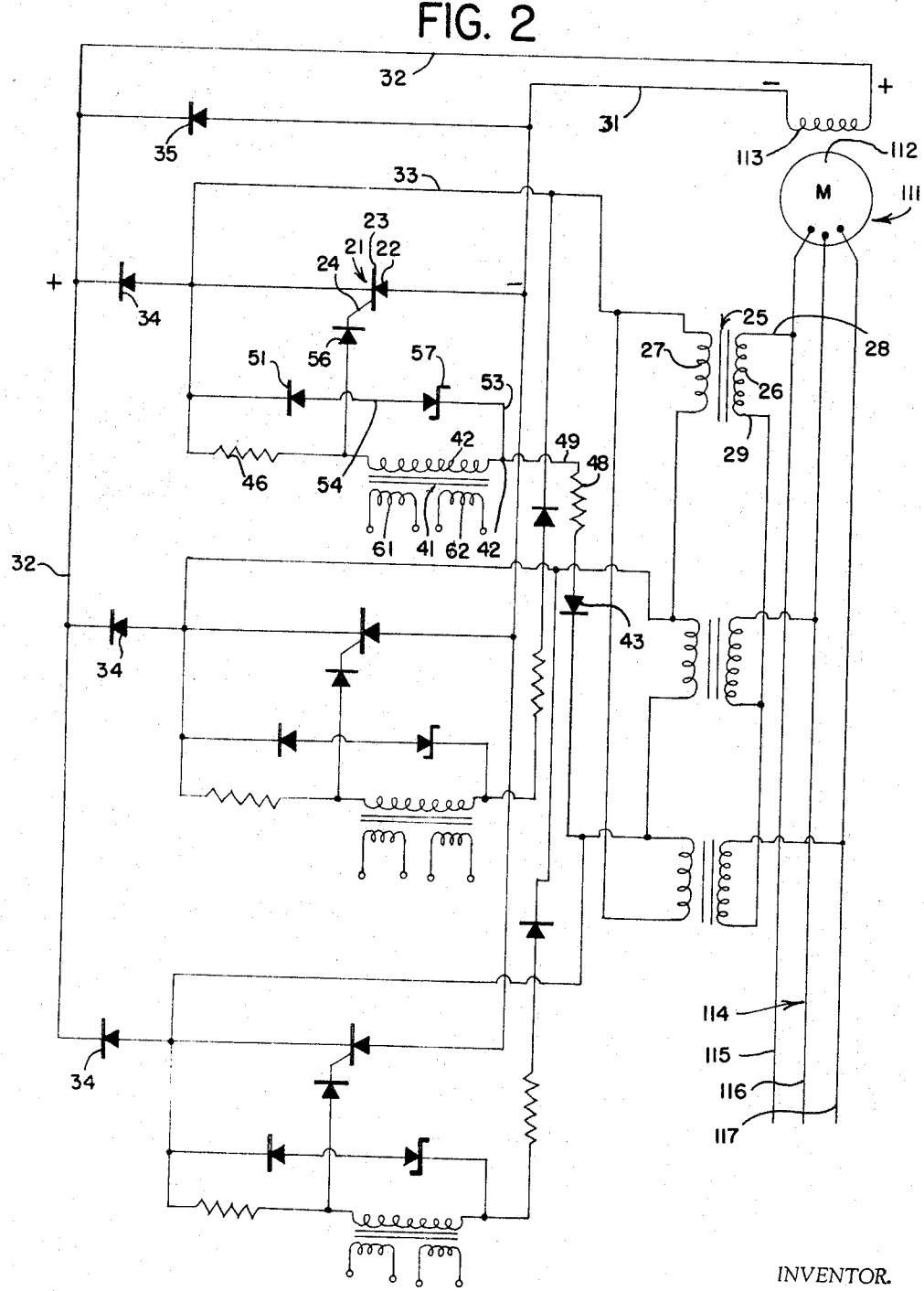
FIG. 2 is a wiring diagram showing the firing device employed in a three phase power factor control utilizing the invention.

In FIG. 2 the invention is shown as applied to a three phase power line 114 having three conductors 115, 116 and 117 feeding a three phase synchronous motor 111. For each phase the system utilizing the invention is substantially the same as for single phase and the same reference numerals will be used to designate the corresponding parts. For the sake of simplicity, the respective controls for the various magnetic amplifiers and the various switches have been omitted. In the single phase system, a single diode 34 is required for rectifying the current for the field winding. In the three phase system three diodes 34 are required, one for each phase. In addition a diode 35 is employed which serves as serge protection. In the three phase system the primaries 26 of transformers 25 are connected in Y to the conductors 114, 115 and 116 while the secondaries 27 are connected in delta and to the respective circuits.

The operation of the three phase system is similar to the operation of the single phase system and the description thereof will not be repeated.

The following values of components has been found to operate successfully in controlling the power factor of a three phase synchronous motor.

Resistor 46—33 ohms, 2 watts.
Resistor 48—300 ohms, 25 watts for 125 volt exciter.
Resistor—600 ohms, 50 watts for 250 volt exciter.
Diodes 34, 56, 51, 43—PRV, 50 volts, .5 amperes.
Voltage regulator 52—Zener diode 7¼ volts, 3 watts.
Silicon controlled rectifier—No. 2N688.

Switches 71, 72, 73 and 74 may be installed in the various circuits 10, 63 and 64 for energizing or de-energizing the various circuits.

The method of operation of the invention is as follows: When switches 71 and 72 are closed, voltage from source 27 is applied to voltage clamping circuit 50 and magnetic amplifier winding 42 in series with resistor 46. If circuit 63 or 64 is not closed, the reactance of winding 42 is low resulting in nearly all the clamped voltage appearing across resistor 46 early in the positive cycle resulting in full output firing of the silicon controlled rectifier 21. Reduced output of silicon controlled rectifier 21 is accomplished by delaying when the magnetic amplifier 41 is fired. The point of firing of the magnetic amplifier can be changed by closing circuit 63 or 64 and varying the source votlage 68. When one of the circuits 63 or 64 is closed, current flows from the source 68 through the winding 61 and produces flux through the core of magnetic amplifier 41. Winding 42 of said amplifier is then energized and a voltage is raised across said winding which is greater than the control voltage and which is impressed on gate 24 of silicon controlled rectifier 21. The magnitude of this voltage determines at what instant of time during the positive cycle the silicon controlled rectifier fires and correspondingly the amount of current delivered to the field winding 13 of motor 12. As is well known, change in the field winding current of a synchronous motor changes the power factor and by means of one or both of the variable rheostats 65 the power factor may be changed at will.

The advantages of the invention are manifest. Magnetic amplifiers with secondaries of lesser turns than those now used for the purpose may be employed. The number of turns is dependent on the line voltage. Thus a single unit may be used for different voltages. Isolation of signals is readily procurable with the invention by using several secondary windings on the magnetic amplifier. The circuitry of the invention is exceedingly simple and relatively inexpensive parts may be used.

Changes in the specific form of the invention, as herein described, may be made within the scope of what is claimed without departing from the spirit of the invention.

Having described the invention, what is claimed as new and desired to be protected by Letters Patent is:

1. In an output circuit energized by an alternating current source and controlled by an electronic trigger valve having output elements and a trigger element, the combination of:
   (a) a magnetic amplifier having
   (b) a firing winding
   (c) a number of control windings,
   (d) a firing circuit connected to the trigger element of said valve and to one of the output elements thereof,
   (e) said firing circuit including said firing winding,
   (f) a limiting resistor connected to said firing winding and the other output element of said valve,
   (g) a voltage clamping circuit comprising a voltage regulator and a rectifier connected in series and shunting said firing winding and limiting resistor and
   (h) a control circuit connected to one or more of said control windings of the magnetic amplifier.

2. In an output circuit energized by an alternating current source and controlled by a silicon controlled rectifier having a cathode, an anode and a gate, the combination of:
   (a) a magnetic amplifier having
   (b) a firing winding and
   (c) a control winding,
   (d) a firing circuit connected to the gate of said silicon controlled rectifier and to the anode thereof,
   (e) said firing circuit including said firing winding,
   (f) a limiting resistor connected to the firing winding and to the cathode of said silicon controlled rectifier,
   (g) a voltage regulator and a rectifier connected in series and shunting said firing winding and limiting resistor,
   (h) a control circuit connected to one or more of said control windings of the magnetic amplifier.

3. In an output circuit energized by an alternating current source and controlled by a silicon controlled rectifier having a cathode, an anode and a gate, the combination of:
   (a) a magnetic amplifier having
   (b) a gate winding and
   (c) a number of control windings,
   (d) a firing circuit including
   (e) a first section connected to one end of said gate winding and to the anode of said silicon controlled rectifier,
   (f) a second section connected to the other end of said firing winding and to the gate of said silicon controlled rectifier, and
   (g) a third section connected to the same end of said firing winding as said second section and to the cathode of said silicon controlled rectifier,
   (h) said first section having a magnetizing resistor and a diode rectifier connected in series therein,
   (i) said second section having a diode rectifier therein, and
   (j) said third section having a limting resistor therein,
   (k) a voltage clamping circuit connected to said first section of said gate circuit at the locality of its connection to said gate winding and to the third section of said gate circuit at the locality of its connection to the cathode of said silicon controlled rectifier,
   (l) said clamping circuit including a rectifier and a voltage regulator therein and
   (m) a control circuit connected to each of said control windings of the magnetic amplifier.

4. In an output circuit energized by an alternating current source and controlled by a silicon controlled rectifier having a cathode, an anode, and a gate, the combination of:
   (a) a magnetic amplifier having
   (b) a firing winding and
   (c) a number of control windings,
   (d) a firing circuit including
   (e) a first section conected to one end of said firing winding and to the anode of said silicon controlled rectifier,
   (f) a second section connected to the other end of said firing winding and to the gate of said silicon controlled rectifier, and
   (g) a third section connected to the same end of said firing winding as said second section and to the cathode of said silicon controlled rectifier,
   (h) said first section having a magnetizing resistor and a rectifier connected in series therein,
   (i) said second section having a rectifier therein, and
   (j) said third section having a limiting resistor therein,
   (k) a voltage clamping circuit connected to said first section of said firing circuit at the locality of its connection to said firing winding and to the third section of said firing circuit at the locality of its connection to the cathode of said silicon controlled rectifier,
   (l) a control circuit connected to one or more of said control windings of the magnetic amplifier.

5. In an output circuit energized by an alternating current source and controlled by an electronic trigger valve having output elements and a trigger element, the combination of:
   (a) a magnetic amplifier having
   (b) a firing winding
   (c) a number of control windings,
   (d) a firing circuit connected to the trigger element of said valve and to one of the output elements thereof,
   (e) said firing circuit including said firing winding,
   (f) a limiting resistor connected to said firing winding and the other output element of said valve,
   (g) a voltage regulator and a rectifier connected in series and shunting said firing winding and limiting resistor and
   (h) a control circuit connected to one or more of said control windings of the magnetic amplifier, and
   (i) an adjustable rheostat in each of said control circuits.

References Cited

UNITED STATES PATENTS

| | | |
|---|---|---|
| 3,222,586 | 12/1965 | Fontenote et al. ___ 318—513 XR |
| 3,222,592 | 12/1965 | Kellogg. |
| 3,230,437 | 1/1966 | Cappello. |
| 3,244,965 | 4/1966 | Gutzwiller. |
| 3,293,533 | 12/1966 | Covert. |

JOHN F. COUCH, *Primary Examiner.*

W. M. SHOOP, Jr., *Assistant Examiner.*